United States Patent
Proebsting et al.

(10) Patent No.: US 7,629,813 B2
(45) Date of Patent: Dec. 8, 2009

(54) DYNAMIC REFRESHED RECEIVER FOR PROXIMITY COMMUNICATION

(75) Inventors: Robert Proebsting, Sonora, CA (US); Robert J. Drost, Mountain View, CA (US); Ronald Ho, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 628 days.

(21) Appl. No.: 11/327,530

(22) Filed: Jan. 5, 2006

(65) Prior Publication Data

US 2007/0153920 A1    Jul. 5, 2007

(51) Int. Cl.
  *H03K 17/16*    (2006.01)
(52) U.S. Cl. .......................... 326/86; 326/34
(58) Field of Classification Search .............. 326/34

See application file for complete search history.

(56) References Cited

U.S. PATENT DOCUMENTS

| 4,888,498 | A | * | 12/1989 | Kadakia | 327/546 |
| 5,047,665 | A | * | 9/1991 | Burt | 330/253 |
| 7,135,893 | B2 | * | 11/2006 | Sugano | 327/65 |

\* cited by examiner

*Primary Examiner*—Rexford N Barnie
*Assistant Examiner*—Thienvu V Tran
(74) *Attorney, Agent, or Firm*—Park, Vaughan & Fleming LLP

(57) ABSTRACT

A system that dynamically refreshes the inputs of a differential receiver. During operation, while a differential transmitter is not transmitting data, the system applies substantially equal voltages to the outputs of the differential transmitter so that the differential voltage on the outputs of the differential transmitter is substantially zero. The system then refreshes the inputs of an associated differential receiver by applying substantially equal voltages to the inputs of the differential receiver so that the differential voltage on the inputs of the differential receiver is substantially zero. The differential transmitter is coupled to the differential receiver through a DC blocking mechanism, which prevents a DC voltage on the differential transmitter from reaching the differential receiver.

21 Claims, 6 Drawing Sheets

DYNAMIC REFRESHED RECEIVER FOR PROXIMITY COMMUNICATION

GOVERNMENT LICENSE RIGHTS

This invention was made with United States Government support under Contract No. NBCH3039002 awarded by the Defense Advanced Research Projects Administration. The United States Government has certain rights in the invention.

BACKGROUND

1. Field of the Invention

The present invention relates to techniques for refreshing the inputs of a receiver. More specifically, the present invention relates to a method and apparatus for refreshing the DC voltage-level of the inputs of a differential receiver.

2. Related Art

Advances in semiconductor technology presently make it possible to integrate large-scale systems, including tens of millions of transistors, onto a single semiconductor chip. Integrating such large-scale systems onto a single semiconductor chip increases the speed at which such systems can operate, because signals between system components do not have to cross chip boundaries, and are not subject to lengthy chip-to-chip propagation delays. Moreover, integrating large-scale systems onto a single semiconductor chip significantly reduces production costs, because fewer semiconductor chips are required to perform a given computational task.

However, these semiconductor chips still need to communicate with other chips, and unfortunately, these advances in semiconductor technology have not been matched by corresponding advances in inter-chip communication technology. Semiconductor chips are typically integrated into a printed circuit board which contains multiple layers of signal lines for inter-chip communication. However, signal lines are typically 100 to 1000 times denser in a semiconductor chip than a printed circuit board. Consequently, only a tiny fraction of the signal lines on a semiconductor chip can be routed across the printed circuit board to other chips. This problem is creating a bottleneck that is expected to worsen as semiconductor integration densities continue to increase.

Furthermore, traditional conductive connections have limitations. For example, wire-bonds or solder-balls can stop conducting due to environmental effects such as oxidation and mechanical stress. They also have undesirable properties, such as low density, low yield, and permanent attachment.

One solution to the limitations of conductive connections is to replace the direct conductive coupling with direct chip-to-chip capacitive coupling, referred to as "Proximity Communication," which significantly increases bandwidth and reduces power consumption when communicating between chips, while also avoiding the need for permanent chip attachments. The capacitive interface used to couple integrated circuit chips together blocks the DC component of the signal.

Blocking the DC component of the signal presents challenges as well as benefits. One challenge is that in order to extract the DC level and properly recover the transmitted information, either the receiver or the spectral content of the signal must be modified. One advantage is that by coupling the signal through a capacitor the DC voltage between the transmitter and the receiver is isolated, thereby allowing the receiver to be set to its optimal gain point regardless of DC voltage at the output of the transmitter.

FIG. 1A illustrates a differential communication channel. It contains transmitter 102, communication channels 104 and 106, and receiver 108. txdata and txdatab are transmitted from transmitter 102 through channels 104 and 106, respectively. Input signals in and inb (corresponding to txdata and txdatab) are received at receiver 108, which then amplifies these signals to produce rxdata and rxdatab, respectively.

FIG. 1B illustrates a differential communication channel using series capacitors 110 and 112 as communication channels 104 and 106, respectively.

More general channel models can include delay or loss elements. For example, a channel model can include a transmission line and series capacitors at the input, output, or both the input and the output of the transmission line. Additionally, the channel model can also include parasitic loss elements such as resistors in series with the transmission line, capacitors shunting the input and output nodes to an AC ground, or inductors in series with the transmission line.

A series capacitor in the conmmunication channel blocks the DC component of a signal. Therefore, a receiver which draws no DC current at the inputs must set its own DC operating point. FIG. 1C illustrates a circuit used to set the DC operating point of a receiver. It contains capacitor 118, which blocks the DC voltage-level generated by the transmitter. PMOS transistor 114 and NMOS transistor 116 form an inverter powered by voltages $V_{LO}$ and $V_{HI}$ which is used in a feedback-loop such that the circuit remembers the previous value transmitted. For example, if in is a 1, then inb is a 0. Note that PMOS transistor 114 and NMOS transistor 116 are sized such that they are weak compared to capacitor 118. In other words, the output of the weak inverter formed by PMOS transistor 114 and NMOS transistor 116 weakly holds in to a value of $V_{HI}$ or $V_{LO}$. Since in is held weakly, a fast switching of txdata transmitted through capacitor 118 can switch the state of the inverter, if appropriate. Note that a slow switching of txdata cannot switch the state of the inverter. On the other hand, noise that may be coupled onto in from power supply bounces, other signals, thermal noise, 1/f noise, or other noise sources, is rejected by holding in strongly enough to overpower the noise.

Note that $V_{HI}$ is set such that it equals $V_{THRESHOLD}+\Delta V$ and $V_{LO}$ is set such that it equals $V_{THRESHOLD}-\Delta V$. $V_{THRESHOLD}$ is the switching threshold of inverter 120. $\Delta V$ is a small voltage such that $V_{THRESHOLD}+\Delta V$ or $V_{THRESHOLD}-\Delta V$ will cause inverter 120 to switch to the low voltage and high voltage of inverter 120, respectively.

Unfortunately, the choice of $\Delta V$ must carefully balance the requirements to reject small perturbations on IN as noise, while not rejecting transitions caused by txdata switching and coupling through capacitor 118.

FIG. 1D illustrates a circuit that overcomes this balancing limitation by simply biasing the in node to $V_{THRESHOLD}$ through large-valued resistor 122. Resistor 122 is chosen to be large so that it averages the effect of many bits. Unfortunately, even though the DC voltage-level of the input of the receiver can be set, an unbalanced string of data (mostly "1"s or mostly "0"s) causes an imbalance in the DC level of the receiver, eventually making data recovery impossible.

One solution to this problem is to encode the data to balance the DC signal content. Encoding techniques such as balanced codes and scramblers can be used. In balanced codes, a set of N data bits are mapped onto M data bits, where M>N so that M/2 bits are "1." Unfortunately, the code reduces the useable bandwidth by (M−N)/M. In scramblers, the data is XOR'ed with a pseudorandom bit-sequence. Although scramblers do not reduce the useable bandwidth, if the data signal correlates with the scrambler sequence, scramblers cannot guarantee that all of the DC signal content is removed.

Another solution is to create electrically floating nodes at the input of the receiver. These nodes have no conductive discharge path. Hence, they can maintain their programmed voltage for years. Unfortunately, the mechanism which programs these nodes often requires special fabrication techniques similar to those used to create EEPROM devices. These special fabrication techniques may not be available in a CMOS fabrication technology.

Hence, what is needed is a receiver that can receive capacitively-coupled signals without the problems described above.

SUMMARY

One embodiment of the present invention provides a system that dynamically refreshes the inputs of a differential receiver. During operation, while a differential transmitter is not transmitting data, the system applies substantially equal voltages to the outputs of the differential transmitter so that the differential voltage on the outputs of the differential transmitter is substantially zero. The system simultaneously refreshes the inputs of an associated differential receiver by applying substantially equal voltages to the inputs of the differential receiver so that the differential voltage on the inputs of the differential receiver is substantially zero. The differential transmitter is coupled to the differential receiver through a DC blocking mechanism, which prevents a DC voltage on the differential transmitter from reaching the differential receiver.

In a variation on this embodiment, the substantially equal voltages are applied to the outputs of the differential transmitter before the substantially equal voltages are applied to the inputs of the differential receiver.

In a variation on this embodiment, to complete the refresh operation, the system ceases to apply the substantially equal voltages to the inputs of the differential receiver, thereby causing the inputs of the differential receiver to float, the inputs still maintaining the substantially equal voltage, wherein floating means that the nodes are no longer driven conductively by any source. Next, the system ceases to apply the substantially equal voltages to the outputs of the differential transmitter as the system resumes the transmission of data from the differential transmitter to the differential receiver.

In a variation on this embodiment, while applying substantially equal voltages to the inputs of the differential receiver, the system sets the voltages for the inputs of the differential receiver such that the differential receiver operates at the best common-mode operating point.

In a variation on this embodiment, applying substantially equal voltages to the outputs of the differential transmitter causes the inputs of the differential receiver to be at substantially equal voltages near a desired voltage. Note that the voltages at the inputs of the differential receiver—before the application of the substantially equal voltages to the inputs—are already substantially equal. Any (very small) difference in the voltage is then a result of differential charge loss due to differential current leakage at the inputs of the differential receiver since the most recent application of the substantially equal voltages.

In a further variation, the system adjusts the substantially equal voltages already near the desired voltage at the inputs of the differential receiver to the desired voltage, thereby eliminating any difference in voltage at the inputs of the differential receiver due to current leakage.

In a variation on this embodiment, the inputs of the differential receiver are refreshed periodically.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Differential Receiver Refresh Circuit

One embodiment of the present invention combines a differential receiver that has dynamic input nodes with a refresh mechanism, which periodically refreshes the input voltages to establish the correct DC voltage-level at the inputs of the differential receiver.

Figure 1A:
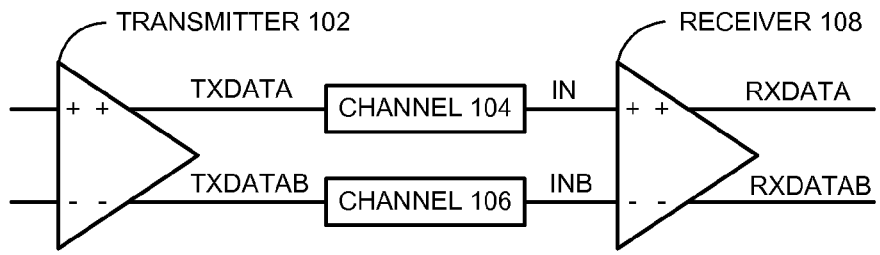
FIG. 1A illustrates a differential communication channel.
Figure 1B:
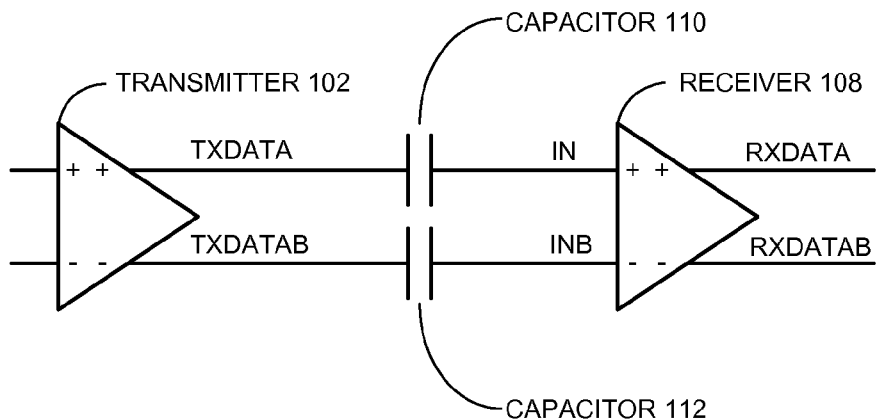
FIG. 1B illustrates a differential communication channel using series capacitors.
Figure 1C:
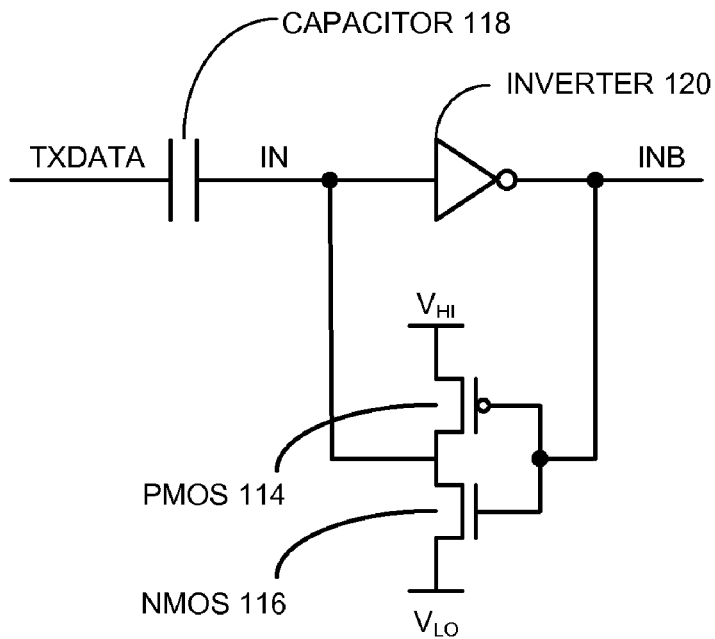
FIG. 1C illustrates a circuit used to set the DC operating point of a receiver.
Figure 1D:
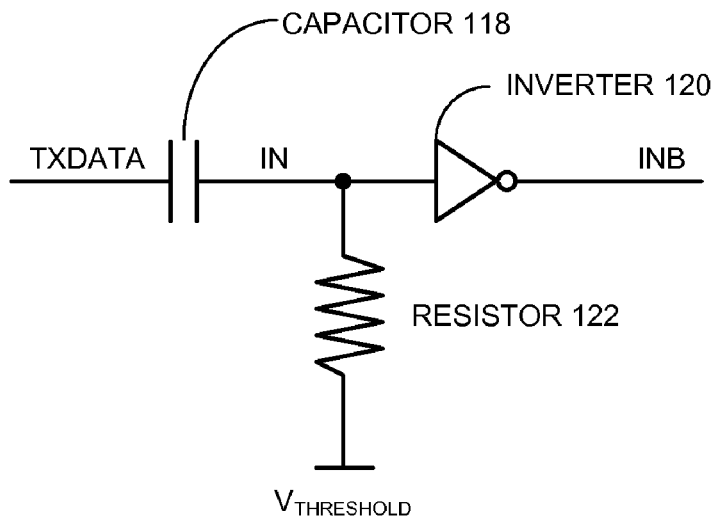
FIG. 1D illustrates a circuit used to set the DC operation point of a receiver.
Figure 2:
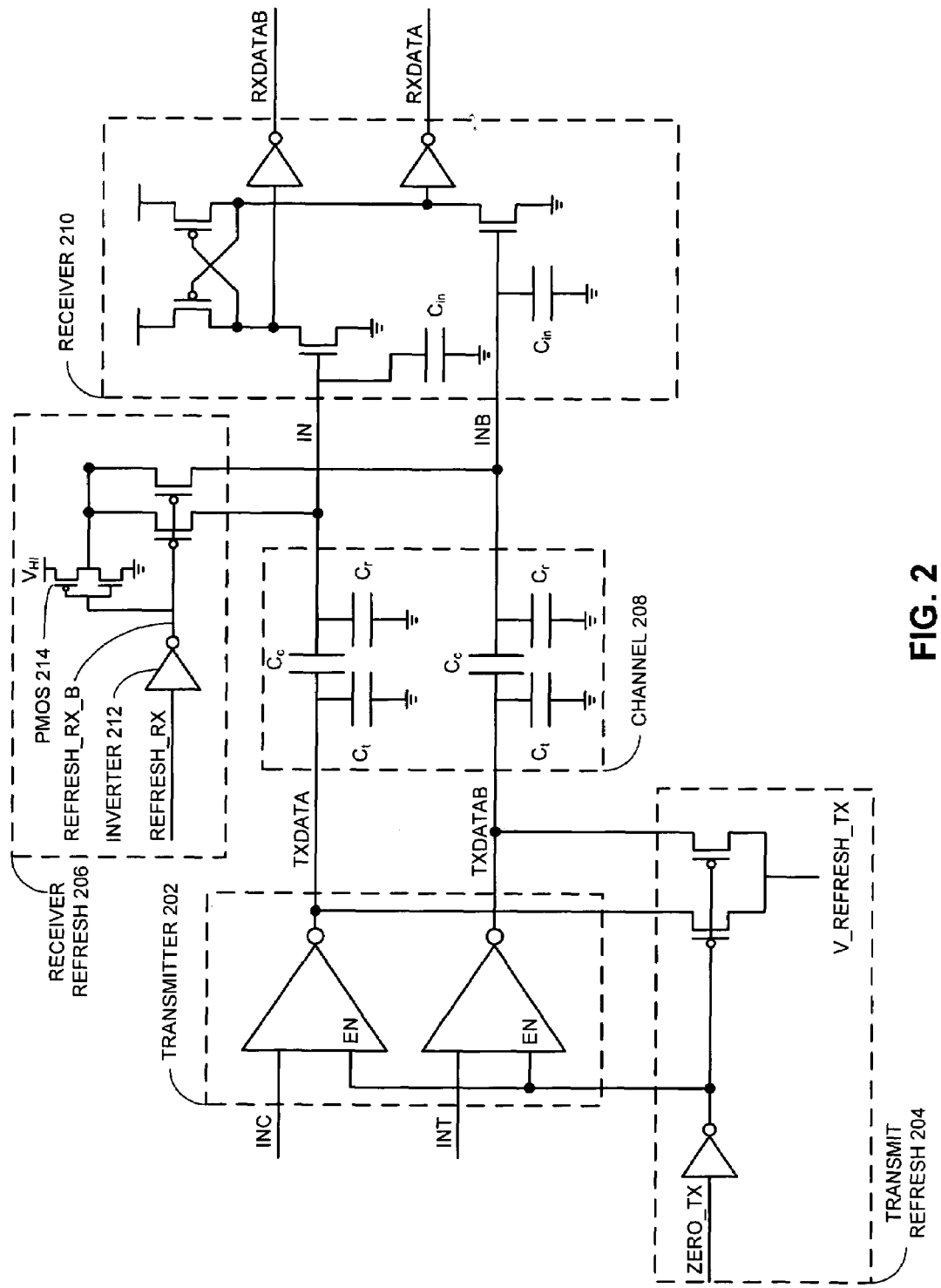
FIG. 2 illustrates a data communication path and the receiver refresh circuits in accordance with an embodiment of the present invention.

For example, FIG. 2 illustrates a data communication path and the receiver refresh circuits in accordance with an embodiment of the present invention. It contains differential transmitter 202, transmit-refresh circuit 204, receiver-refresh circuit 206, communication channel 208, and differential receiver 210. (Note that the following description corresponds to the timing diagram illustrated in FIG. 4, which illustrates the timing of signals for the differential transmitter, the differential receiver, and the refresh circuit in accordance with an embodiment of the present invention.)

During normal operation, both refresh_rx and zero_tx are low, and differential transmitter 202 transmits data applied to int (true) and inc (complement) to differential receiver 210 through communication channel 208. Note that in FIG. 4, the data transitions on txdata appear with no delay on in, and then appear after a small delay on rxdata. Txdata capacitively couples through communication channel 208 onto in and suffers attenuation (but no delay) due to a parasitic capacitance from in to ground. The capacitive divider formed by the chip-to-chip coupling capacitance $C_c$ and the combination of the unwanted parasitic wire capacitance, $C_r$ and the unwanted receiver input capacitance $C_{in}$ reduces the signal amplitude on in to:

$$V(\text{in}) = V(\text{txdata})\frac{C_c}{C_c + C_r + C_{in}}$$

Differential receiver 210 must be sensitive enough to function properly with this attenuated input.

In one embodiment of the present invention, PMOS transistor 214 is powered by $V_{HI}$. $V_{HI}$ sets the common-mode input voltage of the differential receiver. The voltage $V_{HI}$ is chosen such that differential receiver 210 operates at its best common-mode operating point.

Note that the PMOS equilibration transistors in receiver refresh circuit 206 are sized as small as possible to minimize their leakage current. Low-leakage current results in slow drift in the floating input receiver nodes in and inb, allowing a long time interval between refresh operations.

To further reduce leakage current in receiver refresh circuit 206, the input of an inverter is coupled to refresh_rx_b (i.e. the output of inverter 212), and the output of this inverter is coupled to the sources of the PMOS equilibration transistors. When refresh_rx is high, the sources of the PMOS equilibration transistors are at $V_{HI}$, and the gates of the PMOS equilibration transistors are at ground, thereby equilibrating in and inb to the common voltage $V_{HI}$. Note that $V_{HI}$ is set such that differential receiver 210 operates at its best common-mode operating point. In one embodiment of the present invention, $V_{HI}$ is set to VDD. When refresh_rx is low, the sources of the PMOS equilibration transistors are at ground, and the gates are at VDD. This positive gate-to-source voltage minimizes sub-threshold current through these transistors.

Note that $V_{HI}$ can be generated by any technique known in the art, including but not limited to on-chip or off-chip resistive voltage dividers and active circuitry.

Note that to minimize the time to complete the refresh operation, zero_tx is asserted before refresh_rx is asserted. When zero_tx is asserted (first), the voltages on txdata and on txdata_b become substantially equal; therefore, the voltages on in and on inb become substantially equal even before refresh_rx is asserted. Note that prior to sending the first data, a refresh operation is performed to set a known voltage across coupling capacitor $C_c$. If the voltages on in and on inb are substantially equal and substantially near the desired voltage, receiver refresh circuit 206 can equalize the voltages in and inb quickly. If, instead, refresh_rx were asserted while txdata and txdatab still had differential data, in and inb would be equilibrated with txdata and txdatab separated in voltage. Subsequently, when zero_tx is asserted, txdata and txdatab would transition from their differential voltages to their common equilibrate voltage. This would cause the voltage on in and inb to separate due to the coupling capacitance $C_c$. This relatively large differential voltage between in and inb must be equilibrated rather than the small differential voltage found in the preferred timing. This would then require significantly more equilibration time to equalize and to set the differential receiver input voltages to the desired voltage.

Figure 4:
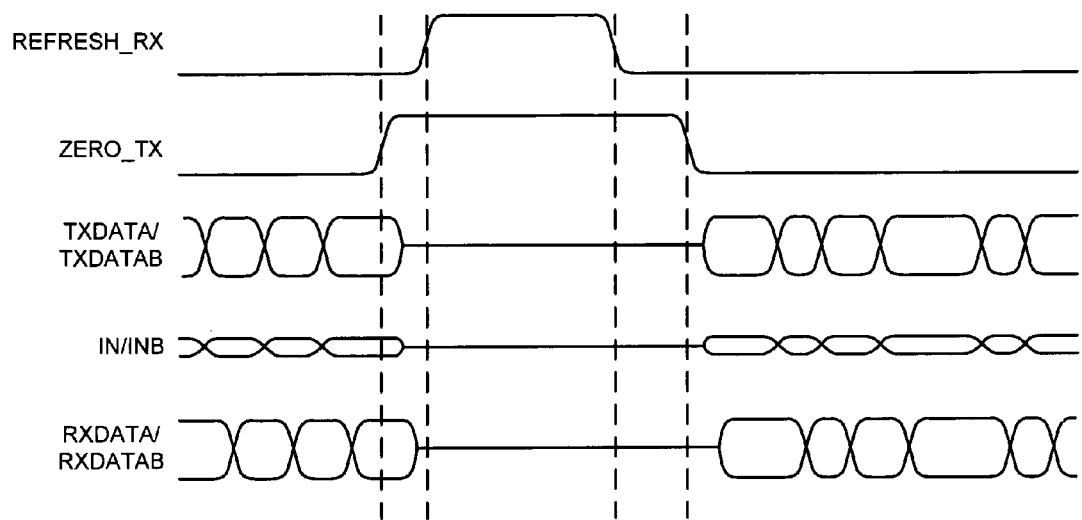
FIG. 4 illustrates a timing diagram for the transmitter, the receiver, and the refresh circuit in accordance with an embodiment of the present invention.

In FIG. 4, the circuit cycles through a refresh operation. Before the refresh operation begins, differential transmitter 202 first stops transmitting new data since it would be lost during the refresh operation. Next, zero_tx is asserted, thereby causing differential transmitter 202 to enter a refresh mode. Asserting zero_tx causes txdata and txdatab to be at approximately equal voltages which, as previously described, causes in and inb to be at approximately equal voltages. Note that any difference in the voltage between in and inb at this time only exists as a result of leakage current through the PMOS equilibration transistors since the last refresh operation.

Next, the refresh_rx signal briefly asserts, thereby causing receiver-refresh circuit 206 in FIG. 2 to pull in and inb to substantially equal voltages through a pair of PMOS equilibration transistors. In one embodiment of the present invention, the common voltage is the supply voltage, VDD. In another embodiment of the present invention, the desired voltages for in and inb are the voltages which cause differential receiver 210 to be near its best common-mode operating point.

Note that the specific circuits to drive the common voltage (either in transmit refresh circuit 204 and/or in receiver refresh circuit 206) can be implemented in many different ways to achieve the desired voltage-level of the common voltage at in and inb. In one embodiment of the present invention, one way to achieve the desired voltage-level of the common voltage is to use a pair of NMOS transistors instead of a pair of PMOS transistors. In this embodiment, the NMOS transistors can be used to set the common voltage substantially near the ground voltage, GND.

Note that although NMOS transistors are preferably used when the common voltage is substantially near the ground voltage, PMOS transistors can still be used if their gates are driven to a sufficiently low voltage. Similarly, note that although PMOS transistors are preferably used when the common voltage is substantially near a high voltage such as the supply voltage VDD, NMOS transistors can still be used if their gates are driven to a sufficiently high voltage.

Since in and inb have no differential voltage during the refresh operation, rxdata and rxdatab contain no useful information. Note that the amplifier may have an amplifier offset voltage which causes rxdata and rxdatab to be differentially high or differentially low. However, during the refresh operation, any value on these signals is ignored.

In one embodiment of the present invention, signal zero_tx is asserted some time before refresh_rx is asserted. Hence, the receiver enters the refresh operation after the transmitter enters the refresh operation. zero_tx causes transmit-refresh circuit 204 in FIG. 2 to disable transmission of differential data by differential transmitter 202, instead driving txdata and txdatab signals through a pair of PMOS transistors to a common voltage, V_refresh_tx.

In one embodiment of the present invention, the common voltage (v_refresh_tx) is equal to the average of the high and low voltages sent on txdata or txdatab to simplify the v_refresh_tx generation circuitry. In other embodiments of the present invention, the common voltage is set higher or lower to cause a small common-mode shift in the voltage at the inputs of the differential receiver.

During the refresh operation, differential transmitter 202 produces no differential voltage, both outputs being driven to the same voltage v_refresh_tx. Simultaneously, receiver refresh circuit 206 programs differential receiver 210 inputs in and inb to zero differential voltage, both inputs being driven to the same voltage $V_{HI}$ as shown. $V_{HI}$ is chosen so that differential receiver 210 operates at its best common-mode input operating voltage.

To exit out of the refresh operation, first, refresh_rx is deasserted causing the input nodes of differential receiver 210 to dynamically float. Next, zero_tx is deasserted, allowing differential transmitter 202 to resume transmitting data.

Note that the capacitance of the coupling capacitor, $C_c$, is unknown because the chip-to-chip spacing (i.e. the capacitor plate-to-plate spacing) varies. If the chip-to-chip spacing is small, the coupling capacitance is high, and the differential signal between in and inb is high. Therefore, the differential receiver works with lots of margin. If the chip-to-chip separation is large, the coupling capacitance is low, and the differential signal between in and inb is low. This preferred biasing technique produces the maximum amplifier output signal by centering the high and low coupled voltages on in and inb around the best common-mode operating point of the differential receiver.

Transmit-Refresh Circuit

Figure 3A:
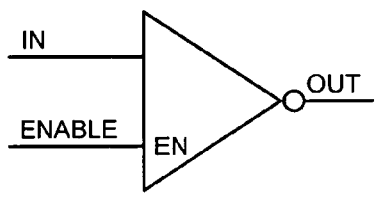
FIG. 3A illustrates a transmitter with an enable signal in accordance with an embodiment of the present invention.
Figure 3B:
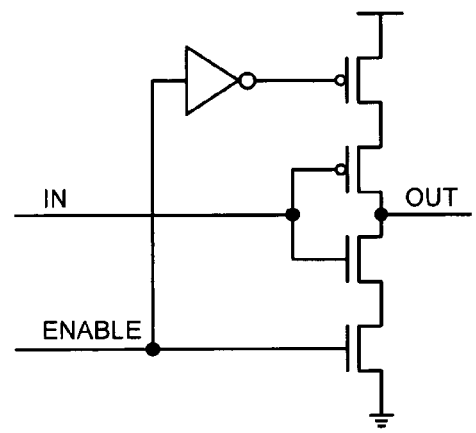
FIG. 3B illustrates an implementation of a transmitter circuit with an enable signal in accordance with an embodiment of the present invention.

FIG. 3A illustrates a transmitter with an enable signal in accordance with an embodiment of the present invention. FIG. 3B illustrates an implementation of the transmitter circuit with an enable signal from FIG. 3A in accordance with an embodiment of the present invention. When enable is set low, out is floating. When enable is set high, the inverse value of in is propagated to out.

Entering and Exiting Receiver Refresh Mode

Figure 5:
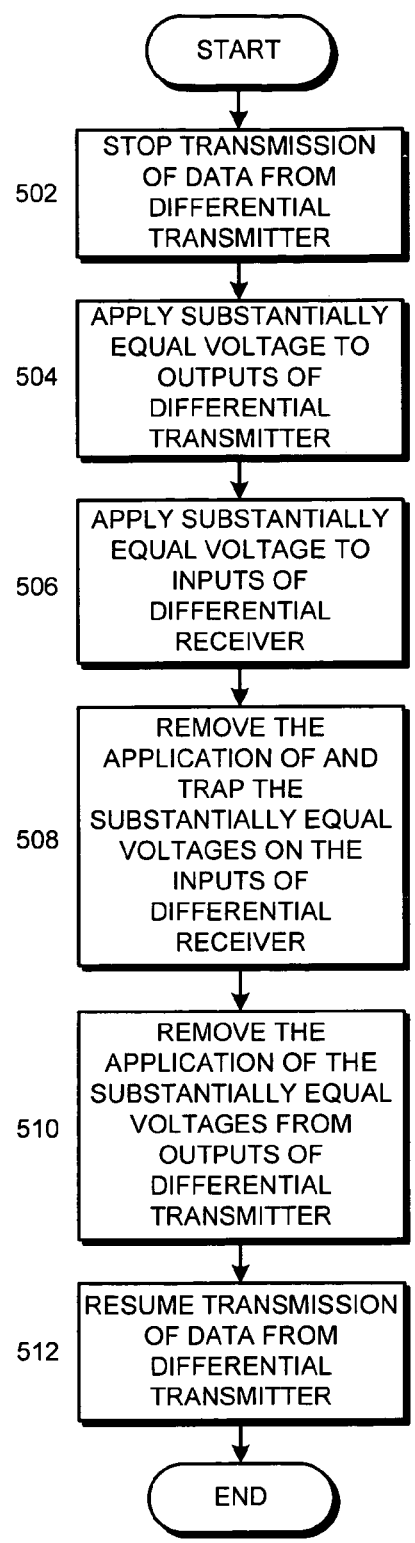
FIG. 5 presents a flow chart illustrating the process of refreshing a differential receiver in accordance with an embodiment of the present invention.

FIG. 5 presents a flow chart illustrating the process of refreshing a differential receiver in accordance with an embodiment of the present invention. The process begins when the system stops transmitting data from the differential transmitter (step 502). Next, the system applies substantially equal voltages to the outputs of the differential transmitter (step 504). In one embodiment of the present invention, the system stops the transmission of data from the differential transmitter and applies substantially equal voltages to the outputs of the differential transmitter simultaneously. The system then applies substantially equal voltages to the inputs of the differential receiver (step 506).

Next, the system removes the application of the substantially equal voltages to the inputs of the differential receiver and traps the substantially equal voltages on the inputs of the differential receiver (step 508). The system then removes the application of the substantially equal voltages from the output of the differential transmitter (step 510) and resumes transmission of data from the differential transmitter to the differential receiver (step 512). In one embodiment of the present invention, the system removes the application of the substantially equal voltages from the outputs of the differential transmitter and resumes transmission of data from the differential transmitter simultaneously.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically refreshing the inputs of a differential receiver, comprising:
    while a differential transmitter, which is coupled to the differential receiver, is not transmitting data,
    applying substantially equal voltages to the outputs of the differential transmitter so that the differential voltage on the outputs of the differential transmitter is substantially zero;
    simultaneously refreshing the inputs of the differential receiver by applying substantially equal voltages to the inputs of the differential receiver so that the differential voltage on the inputs of the differential receiver is substantially zero;
    ceasing to apply the substantially equal voltages to the inputs of the differential receiver, thereby causing the inputs of the differential receiver to float at substantially equal voltages, wherein a node that floats is no longer driven conductively by any source;
    then ceasing to apply the substantially equal voltages to the outputs of the differential transmitter; and
    resuming the transmission of data from the differential transmitter to the differential receiver;
    wherein the differential transmitter is coupled to the differential receiver through a DC blocking mechanism, which prevents a DC voltage on the differential transmitter from reaching the differential receiver.

2. The method of claim 1, wherein the substantially equal voltages are applied to the outputs of the differential transmitter before the substantially equal voltages are applied to the inputs of the differential receiver.

3. The method of claim 1, wherein applying substantially equal voltages to the inputs of the differential receiver involves setting the voltages for the inputs of the differential receiver such that the differential receiver operates at the best common mode operating point.

4. The method of claim 1,
    wherein applying the substantially equal voltages to the outputs of the differential transmitter causes the inputs of the differential receiver to be at substantially equal voltages near a desired voltage; and
    wherein voltages at the inputs of the differential receiver before the application of the substantially equal voltages only differ from each other as a result of differential charge loss due to differential current leakage at the inputs of the differential receiver since the most recent application of the substantially equal voltages.

5. The method of claim 4, further comprising adjusting the substantially equal voltages near the desired voltage at the inputs of the differential receiver to the desired voltage, thereby eliminating the difference in voltage at the inputs of the differential receiver due to current leakage.

6. The method of claim 1, wherein the inputs of the differential receiver are refreshed periodically.

7. The method of claim 1, further comprising minimizing the leakage current at the inputs of the differential receiver by minimizing the size of the voltage equilibration transistors within a receiver refresh mechanism coupled to the inputs of the differential receiver.

8. The method of claim 1, further comprising minimizing the leakage current at the inputs of the differential receiver by reverse biasing the gate to source voltage of the voltage equilibration transistors within a receiver refresh mechanism coupled to the inputs of the differential receiver during data transmission.

9. The method of claim 1, further comprising minimizing the leakage current at the inputs of the differential receiver by:
    minimizing the size of the voltage equilibration transistors within a receiver refresh mechanism coupled to the inputs of the differential receiver; and
    reverse biasing the gate to source voltage of the voltage equilibration transistors within a receiver refresh mechanism coupled to the inputs of the differential receiver during data transmission.

10. The method of claim 1, further comprising if the best common mode input operating voltage of the differential receiver is centered near zero volts, using NMOS equilibration transistors within a receiver refresh mechanism.

11. The method of claim 1, further comprising if the best common mode input operating voltage of the differential receiver is centered near the supply voltage, using PMOS equilibration transistors within a receiver refresh mechanism.

12. An apparatus that dynamically refreshes the inputs of a differential receiver, comprising:
- a differential transmitter, which is coupled to the differential receiver;
- the differential receiver;
- a communication channel, which includes a DC blocking mechanism that couples the differential transmitter to the differential receiver, but prevents a DC voltage on the differential transmitter from reaching the differential receiver;
- a transmit-refresh mechanism, which when activated applies substantially equal voltages to the outputs of the differential transmitter such that the differential voltage on the outputs of the differential transmitter is substantially zero;
- a receiver-refresh mechanism, which when activated applies substantially equal voltages to the inputs of the differential receiver so that the differential voltage on the inputs of the differential receiver is substantially zero;
- wherein prior to resuming the transmission of data from the differential transmitter to the differential receiver, the receiver-refresh mechanism is configured to be deactivated before the transmit-refresh mechanism is deactivated;
- wherein the receiver-refresh mechanism is configured to be deactivated by ceasing to apply the substantially equal voltages to the inputs of the differential receiver, thereby causing the inputs of the differential receiver to float at substantially equal voltages; and
- wherein the transmit-refresh mechanism is configured to be deactivated by ceasing to apply the substantially equal voltages to the outputs of the differential transmitter.

13. The apparatus of claim 12, wherein the substantially equal voltages are applied to the outputs of the differential transmitter before the substantially equal voltages are applied to the inputs of the differential receiver.

14. The apparatus of claim 12, wherein the transmit-refresh mechanism is configured to be activated prior to activating the receiver-refresh mechanism.

15. The apparatus of claim 12, wherein while applying substantially equal voltages to the inputs of the differential receiver, the receiver-refresh mechanism is configured to set the voltages for the inputs of the differential receiver such that the differential receiver operates at the best input common mode operating voltage.

16. The apparatus of claim 12,
- wherein applying the substantially equal voltages to the outputs of the differential transmitter causes the inputs of the differential receiver to be at substantially equal voltages near a desired voltage; and
- wherein the substantially equal voltages at the inputs of the differential receiver before the application of the substantially equal voltages only differ as a result of differential charge loss due to differential current leakage at the inputs of the differential receiver since the most recent application of the substantially equal voltages.

17. The apparatus of claim 16, wherein the receive refresh mechanism is configured to adjust the substantially equal voltages near the desired voltage at the inputs of the differential receiver to the desired voltage, thereby eliminating any difference in voltage at the inputs of the differential receiver due to current leakage.

18. The apparatus of claim 12, wherein the receiver-refresh mechanism is configured to minimize the leakage current at the inputs of the differential receiver by minimizing the size of the voltage equilibration transistors within a receiver refresh mechanism coupled to the inputs of the differential receiver.

19. The apparatus of claim 12, wherein the receiver-refresh mechanism is configured to minimize the leakage current at the inputs of the differential receiver by reverse biasing the gate to source voltage of the voltage equilibration transistors within a receiver refresh mechanism coupled to the inputs of the differential receiver during data transmission.

20. The apparatus of claim 12, wherein the receiver-refresh mechanism is configured to minimize the leakage current at the inputs of the differential receiver by:
- minimizing the size of the voltage equilibration transistors within a receiver refresh mechanism coupled to the inputs of the differential receiver; and
- reverse biasing the gate to source voltage of the voltage equilibration transistors within a receiver refresh mechanism coupled to the inputs of the differential receiver during data transmission.

21. A computer system that dynamically refreshes the inputs of a differential receiver, comprising:
- a differential transmitter, which is coupled to the differential receiver;
- the differential receiver;
- a communication channel, which includes a DC blocking mechanism that couples the differential transmitter to the differential receiver, but prevents a DC voltage on the differential transmitter from reaching the differential receiver;
- a transmit-refresh mechanism, which when activated applies substantially equal voltages to the outputs of the differential transmitter such that the differential voltage on the outputs of the differential transmitter is substantially zero; and
- a receiver-refresh mechanism, which when activated applies substantially equal voltages to the inputs of the differential receiver so that the differential voltage on the inputs of the differential receiver is substantially zero;
- wherein prior to resuming the transmission of data from the differential transmitter to the differential receiver, the receiver-refresh mechanism is configured to be deactivated before the transmit-refresh mechanism is deactivated;
- wherein the receiver-refresh mechanism is configured to be deactivated by ceasing to apply the substantially equal voltages to the inputs of the differential receiver, thereby causing the inputs of the differential receiver to float at substantially equal voltages; and
- wherein the transmit-refresh mechanism is configured to be deactivated by ceasing to apply the substantially equal voltages to the outputs of the differential transmitter.

* * * * *

UNITED STATES PATENT AND TRADEMARK OFFICE
CERTIFICATE OF CORRECTION

PATENT NO. : 7,629,813 B2 Page 1 of 1
APPLICATION NO. : 11/327530
DATED : December 8, 2009
INVENTOR(S) : Proebsting et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 948 days.

Signed and Sealed this

Second Day of November, 2010

David J. Kappos
*Director of the United States Patent and Trademark Office*